United States Patent
Bijwadia et al.

(10) Patent No.: US 12,525,228 B2
(45) Date of Patent: Jan. 13, 2026

(54) UNIFIED END-TO-END SPEECH RECOGNITION AND ENDPOINTING USING A SWITCH CONNECTION

(71) Applicant: Google LLC, Mountain View, CA (US)

(72) Inventors: Shaan Jagdeep Patrick Bijwadia, San Francisco, CA (US); Shuo-yiin Chang, Sunnyvale, CA (US); Bo Li, Fremont, CA (US); Yanzhang He, Palo Alto, CA (US); Tara N. Sainath, Jersey City, NJ (US); Chao Zhang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 292 days.

(21) Appl. No.: 18/340,093

(22) Filed: Jun. 23, 2023

(65) Prior Publication Data

US 2024/0029719 A1    Jan. 25, 2024

Related U.S. Application Data

(60) Provisional application No. 63/369,066, filed on Jul. 21, 2022.

(51) Int. Cl.
| | |
|---|---|
| *G10L 15/16* | (2006.01) |
| *G10L 15/06* | (2013.01) |
| *G10L 25/93* | (2013.01) |

(52) U.S. Cl.
CPC ............ *G10L 15/16* (2013.01); *G10L 15/063* (2013.01); *G10L 25/93* (2013.01)

(58) Field of Classification Search
CPC ....................................................... G10L 15/16
(Continued)

(56) References Cited

U.S. PATENT DOCUMENTS

| 10,929,754 B2 | 2/2021 | Chang et al. |
| 12,272,363 B2 * | 4/2025 | Rosenberg ............ G10L 15/063 |

(Continued)

FOREIGN PATENT DOCUMENTS

CN    113345423 A    9/2021

OTHER PUBLICATIONS

B. Li et al., "A Better and Faster end-to-end Model for Streaming ASR," ICASSP 2021—2021 IEEE International Conference on Acoustics, Speech and Signal Processing (ICASSP), Toronto, ON, Canada, 2021, pp. 5634-5638, doi: 10.1109/ICASSP39728.2021. 9413899. keywords: {Transducers;Measurement uncertainty (Year: 2021).*

(Continued)

*Primary Examiner* — Bharatkumar S Shah
(74) *Attorney, Agent, or Firm* — Honigman LLP; Brett A. Krueger; Grant Griffith

(57) ABSTRACT

A single E2E multitask model includes a speech recognition model and an endpointer model. The speech recognition model includes an audio encoder configured to encode a sequence of audio frames into corresponding higher-order feature representations, and a decoder configured to generate probability distributions over possible speech recognition hypotheses for the sequence of audio frames based on the higher-order feature representations. The endpointer model is configured to operate between a VAD mode and an EOQ detection mode. During the VAD mode, the endpointer model receives input audio frames, and determines, for each input audio frame, whether the input audio frame includes speech. During the EOQ detection mode, the endpointer model receives latent representations for the sequence of audio frames output from the audio encoder, and determines, for each of the latent representation, whether the latent representation includes final silence.

22 Claims, 4 Drawing Sheets

(58) Field of Classification Search
USPC .......................................................... 704/200
See application file for complete search history.

(56) References Cited

U.S. PATENT DOCUMENTS

| | | | | |
|---|---|---|---|---|
| 2020/0335091 | A1* | 10/2020 | Chang | G10L 15/14 |
| 2021/0312906 | A1* | 10/2021 | Kuo | G10L 15/1822 |
| 2022/0351718 | A1* | 11/2022 | Wu | G06N 3/044 |
| 2023/0031733 | A1* | 2/2023 | Wang | G10L 15/22 |
| 2023/0237987 | A1* | 7/2023 | Fukuda | G10L 15/16 |
| | | | | 704/200 |
| 2023/0237989 | A1* | 7/2023 | Kurata | G10L 15/183 |
| | | | | 704/232 |
| 2023/0298565 | A1* | 9/2023 | Rosenberg | G10L 21/003 |
| | | | | 704/235 |
| 2023/0335125 | A1* | 10/2023 | Velikovich | G10L 15/197 |

OTHER PUBLICATIONS

T. N. Sainath et al., "A Streaming On-Device End-to-End Model Surpassing Server-Side Conventional Model Quality and Latency," ICASSP 2020—2020 IEEE International Conference on Acoustics, Speech and Signal Processing (ICASSP), Barcelona, Spain, 2020, pp. 6059-6063, doi: 10.1109/ICASSP40776.2020.9054 (Year: 2020).*

Meng Li et al: "Long-Running Speech Recognizer:An End-to-End Multi-Task Learning Framework for Online ASR and VAD", arxiv. org <http://ARXIV.ORG>, Cornell University Library, 201 Olin Library Cornell University Ithaca, NY 14853, Mar. 2, 2021 (Mar. 2, 2021), XP081904489,the whole document.

International Search Report and Written Opinion relating to PCT/US2023/026035, dated Sep. 22, 2023.

* cited by examiner

UNIFIED END-TO-END SPEECH RECOGNITION AND ENDPOINTING USING A SWITCH CONNECTION

CROSS REFERENCE TO RELATED APPLICATIONS

This U.S. Patent application claims priority under 35 U.S.C. § 119(e) to U.S. Provisional Patent Application No. 63/369,066, filed on Jul. 21, 2022. The disclosure of this prior application is considered part of the disclosure of this application and is hereby incorporated herein by reference in its entirety.

TECHNICAL FIELD

This disclosure relates to unified end-to-end speech recognition and endpointing using a switch connection.

BACKGROUND

Automatic speech recognition (ASR) systems are an increasingly used technology. Modern ASR systems focus on providing not only high quality (e.g., a low word error rate), but also low latency (e.g., a short delay between a user speaking and a transcription or response appearing) speech recognition for spoken utterances. For example, when using a device that implements an ASR system, there is often an expectation that the ASR system decodes utterances in a streaming fashion that corresponds to real-time or even faster than real-time.

SUMMARY

One aspect of the disclosure provides a single end-to-end multitask model for performing speech recognition and endpointing. The multitask model a speech recognition model and an endpointer model. The speech recognition model includes an audio encoder configured to encode a sequence of audio frames into corresponding first higher-order feature representations, the audio encoder including a plurality of multi-head attention layers. The speech recognition model also includes a decoder configured to generate probability distributions over possible speech recognition hypotheses for the sequence of audio frames based on the first higher-order feature representations. The endpointer model is configured to operate between a voice activity detection (VAD) mode and an end-of-query (EOQ) detection mode. During the VAD mode, the endpointer model is configured to receive input audio frames, and determine, for each input audio frame, whether the input audio frame includes speech. During the EOQ detection mode, the endpointer model shares an initial stack of multi-head attention layers from the plurality of multi-head attention layers with the audio encoder and is configured to receive latent representations for the sequence of audio frames output from a final layer of the initial stack of multi-head attention layers, and determine, for each of the latent representation, whether the latent representation includes final silence.

Implementations of the disclosure may include one or more of the following optional features. In some examples, the speech recognition model and the endpointer model are jointly trained on a set of training speech utterances using multitask learning, each training speech utterance in the set of training speech utterances including audio data characterizing the training speech utterance paired with a corresponding transcription of the training speech utterance, and a sequence of reference endpointing labels each including one of a reference speech label, a reference initial silence label, a reference intermediate silence label, or a reference final silence label. Here, the speech recognition model and the endpointer model may be jointly trained on the set of training speech utterances by: determining a speech recognition loss based on speech recognition results predicted for the audio data by the speech recognition model and the corresponding transcriptions of the training speech utterances; training the speech recognition model based on the speech recognition loss; determining an endpointer loss based on the sequence of reference endpointing labels and a corresponding sequence of predicted endpointing labels output by the endpointer model; and training the endpointer model based on the endpointer loss. In some implementations, for each training speech utterance, a switch connection of the multitask model randomly chooses the endpointer model to receive, as input, one of latent representations output from the final layer of the initial stack of multi-head attention layers for the audio data characterizing the training speech utterance, or the audio data characterizing the training speech utterance.

In some implementations, the endpointer model determines the input audio frame includes speech during the VAD mode, the endpointer model switches operation from the VAD mode to the EOQ detection mode. In some examples, the endpointer model determines the latent representation includes final silence during the EOQ detection mode, the endpointer model switches operation from the EOQ detection mode to the VAD mode.

In some examples, the decoder includes a prediction network and a joint network. The prediction is configured to receive, as input, a sequence of non-blank symbols output by a final Softmax layer, and generate, as output, dense representations. The joint network is configured to receive, as input, the dense representations generated by the prediction network at each of a plurality of output steps and the first higher-order feature representation generated by the audio encoder at each of the plurality of output steps, and generate, at each of the plurality of output steps, the probability distribution over possible speech recognition hypotheses. The prediction network may include an LSTM-based prediction network, or a V2 embedding look-up table.

In some implementations, the plurality of multi-head attention layers include conformer layers or transformer layers. In some examples, the speech recognition model also includes a non-causal encoder configured to receive, as input the first higher-order feature representations encoded by the audio encoder, and generate, as output, corresponding second higher-order feature representations for the first higher-order feature representations, and the decoder is configured to generate the probability distributions over possible speech recognition hypotheses for the sequence of audio frames based on the second higher-order feature representations. In some implementations, the endpointer model includes a stack of one or more LSTM layers followed by a fully-connected layer having a Softmax function configured to predict a probability distribution over possible endpointing labels of speech, initial silence, intermediate silence, and final silence.

Another aspect of the disclosure provides a computer-implemented executed on data processing hardware that causes the data processing hardware to perform operations that include receiving a sequence of audio frames characterizing an utterance, processing, by an audio encoder of a single end-to-end multitask model, the sequence of audio frames to generate corresponding first higher-order feature representations, the audio encoder including a plurality of multi-head attention layers, and generating, by a decoder of the multitask model, probability distributions over possible speech recognition hypotheses for the sequence of audio frames based on the first higher-order feature representations. The operations also include using an endpointer model of the multitask model that shares an initial stack of multi-head attention layers from the plurality of multi-head attention layers with the audio encoder, during a voice activity detection (VAD) mode, determining, for each corresponding audio frame in the sequence of audio frames, whether the corresponding audio frame includes speech and, during an end-of-query (EOQ) detection mode, determining, for each corresponding latent representation of a plurality of latent representations for the sequence of audio frames output from a final layer of the initial stack of multi-head attention layers, whether the corresponding latent representation includes final silence.

Implementations of the disclosure may include one or more of the following optional features. In some examples, the operations further include training the audio encoder, the decoder, and the endpointer model jointly on a set of training speech utterances using multitask learning, each training speech utterance in the set of training speech utterances including audio data characterizing the training speech utterance paired with a corresponding transcription of the training speech utterance, and a sequence of reference endpointing labels each including one of a reference speech label, a reference initial silence label, a reference intermediate silence label, or a reference final silence label. Training the audio encoder, the decoder, and the endpointer model jointly on the set of training speech utterances may include determining a speech recognition loss based on the transcriptions of the training speech utterances and corresponding speech recognition results predicted for the audio data by the audio encoder and the decoder; training at least one of the audio encoder or the decoder based on the speech recognition loss; determining an endpointer loss based on the sequence of reference endpointing labels and a corresponding sequence of predicted endpointing labels output by the endpointer model; and training the endpointer model based on the endpointer loss. In some examples, the operations further include, for each training speech utterance, randomly choosing, using a switch connection of the multitask model, the endpointer model to receive, as input, one of latent representations output from the final layer of the initial stack of multi-head attention layers for the audio data characterizing the training speech utterance, or the audio data characterizing the speech utterance.

In some implementations, the operations further include, based on determining the corresponding audio frame includes speech during the VAD mode, switching operation of the endpointer model from the VAD mode to the EOQ detection mode. In some examples, the operations further include, based on determining the corresponding latent representation includes final silence during the EOQ detection mode, switching operation of the endpointer model from the EOQ detection mode to the VAD mode.

In some examples, the decoder includes a prediction network and a joint network, and the operations further include, at each of a plurality of output steps, generating, by the prediction network, based on a sequence of non-blank symbols output by a final Softmax layer, corresponding dense representations, and generating, by the joint network, a corresponding probability distribution over possible speech recognition hypotheses based on the corresponding dense representation generated by the prediction network at the corresponding output step. In some implementations, the prediction network includes a LSTM-based prediction network, or a V2 embedding look-up table.

In some implementations, the plurality of multi-head attention layers include conformer layers or transformer layers. In some examples, the operations also include generating, using a non-causal encoder of the multitask model, a corresponding second higher-order feature representation for each first higher feature representation generated by the audio encoder, and generating the probability distributions over possible speech recognition hypotheses for the sequence of audio frames based on the second higher-order feature representations. In some implementations, the endpointer model includes a stack of LSTM layers followed by a fully-connected layer having a Softmax function configured to predict a probability distribution over possible endpointing labels of speech, initial silence, intermediate silence, and final silence.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
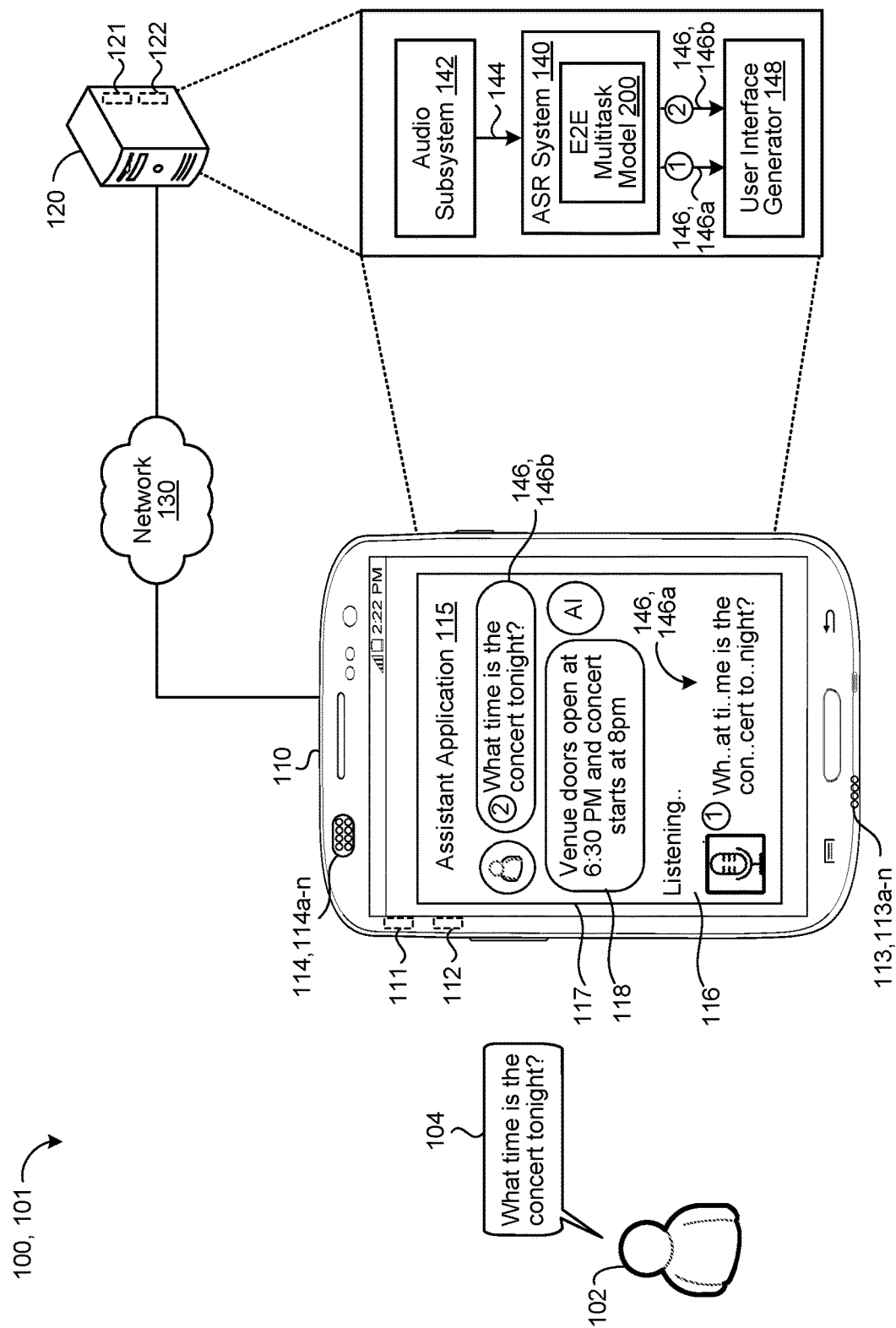
FIG. 1 is a schematic view of an example speech environment using an end-to-end (E2E) multitask model for transcribing speech and endpointing.

Automatic speech recognition (ASR) systems are an increasingly used technology. Modern ASR systems focus on providing not only high quality (e.g., a low word error rate), but also low latency (e.g., a short delay between a user speaking and a transcription or response appearing) speech recognition for spoken utterances. For example, when using a device that implements an ASR system, there is often an expectation that the ASR system decodes utterances in a streaming fashion that corresponds to real-time or even faster than real-time. Conventional speech recognition models rely on a separate, distinct, and separately trained endpoint model for performing endpointing. Endpointing includes voice activity detection (VAD) and end-of-query (EOQ) detection. VAD classifies each input audio frame according to whether it contains speech or silence. VAD classification can be used for "frame filtering" whereby non-speech frames are discarded. That is, not input to, or processed by, a speech recognition model thereby avoiding unnecessary computations of the speech recognition model, which is especially important for battery-powered user devices. EOQ detection classifies each input audio frame according to predict whether or not an ongoing utterance has ended or contains an intermediate period of silence. For continuous-query tasks (e.g., voice dictation), high-quality EOQ detection is critical to pausing the speech recognition model during intermediate silence periods. This is especially important for battery-powered user devices because continuous-query tasks may continue for an arbitrarily long period of time. For short-query tasks, such for digital assistant or interactive voice response applications, EOQ detection predicts when a user is done speaking, such that the speech recognition model can complete or finalize a transcription of a query and timely generate a response. For short-query tasks, high-quality EOQ detection is critical to reducing speech recognition latency, because a response to a query is typically not generated until the speech recognition model finalizes a transcription. For voice recognition systems, user-perceived latency (UPL) is a very important factor in user satisfaction. Accordingly, there is a need for improved VAD and EOQ detection.

Implementations herein are directed toward end-to-end (E2E) multitask models and methods for performing speech recognition, endpointing, VAD, and EOQ detection. The E2E multitask models integrate a speech recognition model with an endpointer model into a single model that is trained to perform multiple tasks. Here, the speech recognition model may be an E2E speech recognition model integrating an acoustic model and a language model. By integrating the endpointer model with the speech recognition model into a single multitask model, the endpointer model may generate improved EOQ detection predictions by basing EOQ detections on latent representations generated by an audio encoder of the speech recognition model rather than on raw audio frames. Here, the endpointer model shares one or more layers with the audio encoder of the speech recognition model using, for example, hard parameter sharing. Notably, the speech recognition model and the endpointer model may be jointly trained. By integrating and jointly training the speech recognition model and the endpointer model, VAD and EOQ detection performance may be improved, as joint training forces the speech recognition model and the endpointer model to learn representations that generalize well across related tasks. Moreover, by integrating the speech recognition model and the endpointer model into a single integrated multitask model, the infrastructural burden of building and deploying speech recognition systems is reduced because only the single integrated model needs to be trained, deployed, and maintained.

In some implementations, even a single layer of an audio encoder of a speech recognition model may be substantially more complex than the endpointer model. Thus, to reduce complexity for VAD prior to speech recognition being initiated, E2E multitask model implementations disclosed herein include a switch connection that allows the endpointer model to operate in two modes—a VAD mode, and an EOQ detection mode. In the VAD mode, the switch connection provides input audio frames to the endpointer model, and the endpointer model performs VAD based on the audio frames. Thus, in VAD mode, which occurs prior to starting speech recognition, the shared layers of the audio encoder do not need not be activated. In the VAD mode, when the endpointer model detects speech, audio frames will then be fed to the speech recognition model, the speech recognition model (including the audio encoder) will be activated, and the endpointer model will switch operation from the VAD mode to the EOQ detection mode. In the EOQ detection mode, the switch connection provides latent representations output from a final layer of the shared layers to the endpointer model, and the endpointer model performs EOQ detection based on the latent representations. Thus, in the EOQ detection mode, the endpointer model may take advantage of, or leverage, the latent representations already being generated by the audio encoder for speech recognition purposes. Because the EOQ detection mode is only active during speech recognition, during which the audio encoder is active for speech recognition purposes, EOQ detection performance may be improved by being based on the latent representations generated by the audio encoder without increasing computational complexity. In the EOQ detection mode, when the endpointer model detects final silence ending an utterance, the switch connection will feed audio frames to the speech recognition model, the speech recognition model (including the audio encoder) will be activated, and the endpointer model will switch operation from the EOQ detection mode to the VAD mode.

Disclosed E2E multitask models have been shown, for short-query tasks, to reduce mean EOQ detection latency by over thirty percent and to reduce $90^{th}$ percentile EOQ detection latency by over 20 percent with no regression in word error rate (WER). Furthermore, for continuous-query tasks, disclosed E2E multitask models have been shown to improve WER by integrating speech recognition and endpointing tasks.

FIG. 1 is a schematic view of an example of a speech environment 100 and system 101. In the speech environment 100, a user's manner of interacting with a computing device, such as a user device 110, may be through voice input. The user device 110 (also referred to generally as a device 110) is configured to capture sounds (e.g., streaming audio data) from one or more users 102 within the speech environment 100. Here, the streaming audio data may refer to a spoken utterance 104 by the user 102 that functions as an audible query, a command for the user device 110, or an audible communication captured by the user device 110 (e.g., a dictation for transcription). Speech-enabled systems of the user device 110 may field the query or the command by answering the query and/or causing the command to be performed/fulfilled by one or more downstream applications.

The system 101 includes the user device 110, a remote computing system 120, and a network 130. The user device 110 may be any computing device capable of communicating with the remote computing system 120 through the network 130. The user device 110 may correspond to any computing device associated with a user 102 and capable of receiving audio data. Some examples of user devices 110 include, but are not limited to, mobile devices (e.g., mobile phones, tablets, laptops, etc.), computers, wearable devices (e.g., smart watches), smart appliances, internet of things (IoT) devices, digital assistant devices, vehicle infotainment systems, smart displays, smart speakers, etc. The user device 110 includes data processing hardware 111 and memory hardware 112 in communication with the data processing hardware 111 and storing instructions, that, when executed by the data processing hardware 111, cause the data processing hardware 111 to perform one or more operations. The user device 110 further includes an audio system 142 with one or more audio capture devices 113, 113a—n (e.g., microphones) for capturing and converting spoken utterances 104 within the speech environment 100 into electrical signals and one or more audio output devices 114, 114a—n (e.g., speakers) for communicating audible audio signals (e.g., as output audio data from the user device 110). While the user device 110 implements a single audio capture device 113 in the example shown, the user device 110 may implement an array of audio capture devices 113 without departing from the scope of the present disclosure, whereby one or more audio capture devices 113 in the array may not physically reside on the user device 110, but may be in communication with the user device 110. Similarly, while the user device 110 implements a single audio output device 114 in the example shown, the user device 110 may implement an array of audio output devices 114 without departing from the scope of the present disclosure, whereby one or more audio output devices 114 in the array may not physically reside on the user device 110, but may be in communication with the user device 110.

The remote computing system 120 may be a distributed system (e.g., a cloud computing environment) having scalable elastic resources. The resources include computing resources 121 (e.g., data processing hardware) and/or storage resources 122 (e.g., memory hardware). Additionally or alternatively, the remote computing system 120 may be a centralized system. The network 130 may be wired, wireless, or a combination thereof, and may include private networks and/or public networks, such as the Internet.

In the example system 101, an automated speech recognition (ASR) system 140 implementing a single E2E multitask model 200 resides on the user device 110 of the user 102 and/or on the remote computing system 120 in communication with the user device 110 via the network 130. The user device 110 and/or the remote computing system 120 also includes an audio subsystem 142 configured to receive the utterance 104 spoken by the user 102 and captured by the audio capture device(s) 113, and convert the utterance 104 into a corresponding digital format associated with input audio frames 144 capable of being processed by the ASR system 140. In the example shown, the user 102 speaks a respective utterance 104 and the audio subsystem 142 converts the utterance 104 into corresponding audio frames 144 (e.g., audio data) for input to the ASR system 140. Thereafter, the E2E multitask model 200 receives, as input, the audio frames 144 corresponding to the utterance 104, and generates/predicts, as output, a corresponding transcription 146 (e.g., recognition result/hypothesis) of the utterance 104. In the example shown, the E2E multitask model 200 may perform streaming speech recognition to produce an initial speech recognition result 146, 146a, and a rescorer (not shown for clarity of illustration) may update (i.e., rescore) the initial speech recognition result 146a to produce a final speech recognition result 146, 146b.

The user device 110 and/or the remote computing system 120 also executes a user interface generator 148 configured to present a representation of the transcription 146 of the utterance 104 to the user 102 of the user device 110. As described in greater detail below, the user interface generator 148 may display the initial speech recognition results 146a in a streaming fashion during time 1 and subsequently display the final speech recognition result 146b during time 2. In some configurations, the transcription 146 output from the ASR system 140 is processed, e.g., by a natural language processing/understanding (NLP/NLU) module executing on the user device 110 or the remote computing system 120, to execute a user command/query specified by the utterance 104. NLP/NLU generally refers to a process of interpreting written language (e.g., the speech recognition results 146) and determining whether the written language prompts any action. Additionally or alternatively, a text-to-speech system (not shown for clarity of illustration) (e.g., executing on any combination of the user device 110 or the remote computing system 120) may convert the transcription 146 into synthesized speech for audible output by the user device 110 and/or another device.

In the example shown, the user 102 may interact with a program or application 115 (e.g., a digital assistant application) of the user device 110 that uses the ASR system 140. For instance, FIG. 1 depicts the user 102 communicating with the digital assistant application 115 and the digital assistant application 115 displaying a digital assistant interface 116 on a screen 117 of the user device 110 to depict a conversation between the user 102 and the digital assistant application 115. In this example, the user 102 asks the digital assistant application 115, "What time is the concert tonight?" This question from the user 102 is a spoken utterance 104 captured by the audio capture device 113 and processed by an audio system 142 of the user device 110. In this example, the audio system 142 receives the spoken utterance 104 and converts it into audio frames 144 for input to the ASR system 140. Continuing with the example, a single E2E multitask model 200 integrating a speech recognition model 210 and an endpointer model 220 (see FIG. 2) of the ASR system 140, while receiving the audio frames 144 corresponding to the utterance 104 as the user 102 speaks, encodes the audio frames 144 and then decodes the encoded audio frames 144 into the speech recognition results 146.

In the example shown in FIG. 1, the digital assistant application 115 may respond to the question posed by the user 102 using NLP/NLU. In this example, the digital assistant application 115 uses NLP/NLU to recognize that the question from the user 102 regards the user's schedule and more particularly a concert on the user's schedule. By recognizing these details with NLP/NLU, the digital assistant application 115 returns a response 118 to the user's utterance 104 where the response 118 states, "Venue doors open at 7:30 PM and concert starts at 9 pm." In some configurations, NLP/NLU occurs on the remote computing system 120 in communication with the user device 110.

Figure 2:
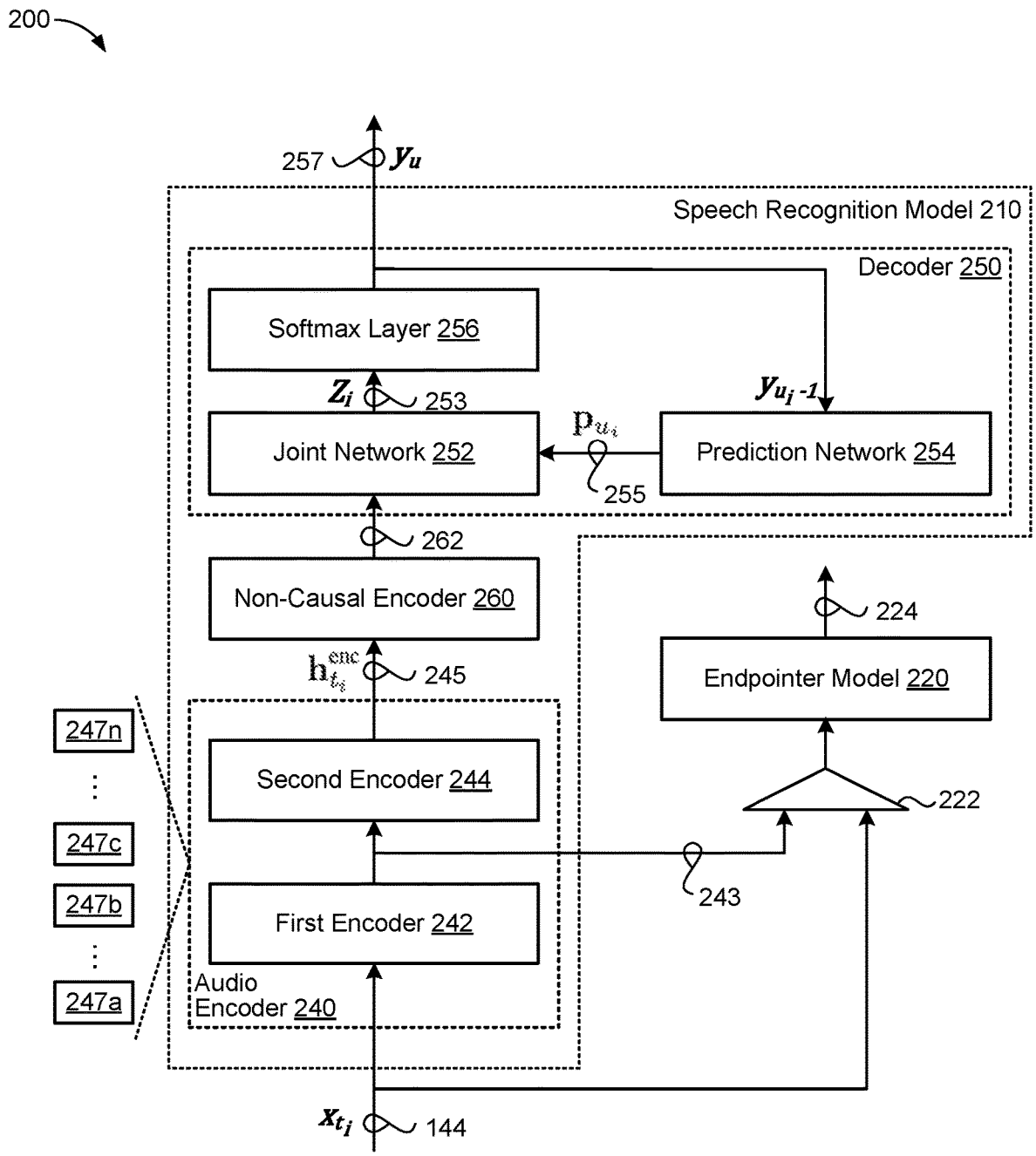
FIG. 2 is a schematic view of an example E2E multitask model architecture having a speech recognition model, an endpointer model, and a switch connection.

FIG. 2 is a schematic view of an example E2E multitask model 200 for performing speech recognition, endpointing, VAD, and EOQ detection. As shown, the E2E multitask model 200 includes and integrates together a speech recognition model 210, an endpointer model 220, and a switch connection 222 into a single multitask model. Notably, the speech recognition model 210, the endpointer model 220, and the switch connection 222 of the E2E multitask model 200 and may be jointly trained, deployed, and maintained. As described herein, the user device 110 executes the E2E multitask model 200. However, it is understood that the remote computing system 120 may also perform one or more portions, or all, of the E2E multitask model 200 in addition to, or in lieu of, the user device 110.

In the example shown, the speech recognition model 210 includes a streaming, cascaded conformer-transducer (Conf-T) architecture including an audio encoder 240, and a decoder 250. Here, the audio encoder 240 includes a cascading, causal encoder architecture having a first encoder 242 and a second encoder 244. The cascading audio encoder 240 refers to a model structure where the encoding pathway includes the two encoders 242, 244 that cascade such that the output of the first encoder 242 feeds the input of the second encoder 244 prior to decoding.

The first encoder 242 receives or obtains a sequence of d-dimensional feature vectors (e.g., audio frames 144 (FIG. 1)) $x=(x_1, x_2, \ldots, x_T)$, where $x_i \in \mathbb{R}^d$, and encodes the sequence of audio frames 144 into corresponding latent representations 243 as outputs of a final layer of the first encoder 242. The second encoder 244 is connected in cascade to the first encoder 242, and is trained to receive the latent representations 243 as inputs, and encode the latent representations 243 into corresponding first higher-order feature representations 245 as outputs of a final layer of the second encoder 244. This first higher-order feature representation 245 is denoted as $h_1^{enc}, \ldots, h_T^{enc}$. Here, each audio frame 144 includes a 128-dim log-mel feature vector computed for a 32 millisecond window every 10 milliseconds and stacked with three previous feature vectors to produce a 512-dim audio frame 144.

In some examples, the speech recognition model 210 also includes a non-causal encoder 260 configured to receive as input the first higher order feature representations 245 and generate as output corresponding second higher-order feature representations 262 for the first higher-order feature representations 245.

In some implementations, the cascading audio encoder 240 includes a stack of a plurality (e.g., seven) of multi-head (e.g., eight headed) attention layers 247, 247a—n (e.g., conformer or transformer layers), with (i) the first encoder 242 including an initial stack of layers 247a—b (e.g., two) from the stack of the plurality of layers 247 with an attention dimension of 512, and (ii) the second encoder 244 including a time-reduction stacking layer that down samples its input by a factor of two followed by another multi-head attention layer 247c from the stack of the plurality of multi-head attention layers 247, a projection layer, and the rest of the multi-head attention layers 247d—n from the stack of the plurality of multi-head attention layers 247. Here, causal convolution and left-context attention layers may be used for each layer to strictly restrict the audio encoder 240 to use no future inputs. The first encoder 242 may be referred to as a causal encoder and the second encoder 244 may be referred to as a non-causal encoder.

The endpointer model 220 is configured to operate between a VAD mode and an EOQ detection mode. While the endpointer model 220 is operating in the VAD mode, the switch connection 222 provides input audio frames 144 to the endpointer model 220, and the endpointer model 220 performs VAD based on the audio frames 144. When the endpointer model 220 is operating in the VAD mode, which occurs prior to starting speech recognition, the speech recognition model 210 (including the shared first encoder 242) is not, or does not need to be, activated (i.e., audio frames 144 do not need to be sent to or processed by the speech recognition model 210) because the endpointer model 220 is performing VAD based on the audio frames 144. In the VAD mode, the endpointer model 220 outputs, for each audio frame 144, an endpoint label 224 that indicates whether or not the audio frame 144 includes speech. During the VAD mode, the endpointer model 220 selects each endpoint label 224 to be initial silence (i.e., silence before the start of an utterance) or speech. Here, the endpointer model E2E multitask model 200 may determine whether or not an audio frame 144 includes speech by comparing a speech present prediction probability to a pre-determined probability threshold.

When the endpointer model 220 determines that one or more audio frames 144 include speech and outputs one or more endpoint labels 224 of speech, the E2E multitask model 200: (i) activates the speech recognition model 210 so that the speech recognition model 210 begins performing speech recognition on a sequence of audio frames 144; (ii) configures the switch connection 222 to provide latent representations 243 for the sequence of audio frames 144 generated by a shared portion of the audio encoder 240 (i.e., the first encoder 242) to the endpointer model 220; and (iii) switches operation of the endpointer model 220 from the VAD mode to the EOQ detection mode. In the EOQ detection mode, the endpointer model 220 determines, for each latent representation 243, whether or not the latent representation 243 includes a final silence representing that an EOQ event has occurred or includes an intermediate silence, and outputs a corresponding endpoint label 224 of final silence or intermediate silence. Here, the endpointer model 220 selects each endpoint label 224 to be speech, intermediate silence (e.g., silence in the middle of an utterance), or final silence (e.g., after the end of an utterance). Here, the endpointer model E2E multitask model 200 may determine whether or not an audio frame 144 includes speech by comparing a speech present prediction probability to a pre-determined probability threshold. Notably, the pre-determined probability threshold for the EOQ detection mode may be different from the pre-determined probability threshold for the VAD mode.

While the endpointer model 220 is operating in the EOQ detection mode, the switch connection 222 provides latent representations 243 output from a final layer 247b of the shared layers 247a—b (i.e., the first encoder 242) to the endpointer model 220, and the endpointer model 220 performs EOQ detection based on the latent representations 243. Thus, in the EOQ detection mode, the endpointer model 220 takes can take advantage of, or leverage, the latent representations 243 already being generated by the audio encoder 240 for speech recognition purposes to improve EOQ detection performance without increasing computational complexity. That is, because the EOQ detection mode is only active during speech recognition, during which the audio encoder 240 is active for speech recognition purposes, EOQ detection performance may be improved by being based on the latent representations 243 already being generated by the audio encoder 240 without increasing computational complexity.

In the example shown, while operating in the EOQ detection mode, the endpointer model 220 shares one or more layers 247a—b with the audio encoder 240 of the speech recognition model 210. Here, the endpointer model 220 shares the first encoder 242 with the audio encoder 240, the first encoder 242 represents an initial stack of multi-head attention layers 247a—b (e.g., conformer or transformer layers) of a stack 246 of a plurality of multi-head attention layers 247a—n that form the audio encoder 240, and the latent representations 243 are output by a final layer 247b of the initial stack of layers 247a—b of the first encoder 242. In some implementations, the endpointer model 220 and the audio encoder 240 share layers using hard parameter sharing. Notably, the speech recognition model 210 and the endpointer model 220 may be jointly trained. By integrating and jointly training the speech recognition model 210 and the endpointer model 220, VAD and EOQ detection performance is improved, as joint training forces the speech recognition model 210 and the endpointer model 220 to learn representations that generalize well across related tasks. When the endpointer model 220, while operating in the EOQ detection mode, determines that one or more latent representations 243 include a final silence and outputs an endpoint label 224 of final silence, the E2E multitask model 200: (i) switches operation of the endpointer model 220 from the EOQ detection mode to the VAD mode; (ii) configures the switch connection 222 to provide input audio frames 144 to the endpointer model 220; and (iii) disables the speech recognition model 210.

In some implementations, when the endpointer model 220, while operating in the EOQ detection mode, determines that one or more latent representations 243 include an intermediate silence and outputs an endpoint label 224 of intermediate silence, the E2E multitask model 200: (i) temporarily switches operation of the endpointer model 220 from the EOQ detection mode to the VAD mode; (ii) configures the switch connection 222 to provide input audio frames 144 to the endpointer model 220; and (iii) temporarily disables the speech recognition model 210. When speech continues (e.g., when the endpointer model 220 operating in VAD mode detects speech), the E2E multitask model 200 reverts the endpointer model 220 back to EOQ detection mode and resumes speech recognition by the speech recognition model 210. In this way, the speech recognition model 210 does not need to operate during intermediate silences. In some implementations, the endpointer model 220 includes a stack of LSTM layers followed by a fully-connected layer having a Softmax function configured to predict a probability distribution over possible endpointing labels of speech, initial silence, an intermediate silence, and final silence.

In the example shown, the decoder 250 includes an RNN-T architecture having a joint network 252, a prediction network 254, and a Softmax layer 256. The decoder 250 uses the joint network 252 to combine the first higher-order feature representation 245 and/or the second higher-order feature representation 262 with dense or hidden representations 255 output from the prediction network 254 for previous prediction outputs 257 by the Softmax layer 256 to produce prediction outputs 257. In the example shown, the decoder 250 includes the Softmax layer 256. Alternatively, the Softmax layer 256 may be implemented separately.

In the example shown, the prediction network 254 processes sequence of non-blank symbols 257 (i.e., prediction outputs) output by the final Softmax layer 256 so far, $y_0, \ldots, y_{ui-1}$, into a dense or hidden representation $p_{u_i}$ 255. In some implementations, the dense representation $p_{u_i}$ 255 includes a single embedding vector. Notably, the sequence of past non-blank symbols 257 received at the prediction network 254 capture linguistic dependencies between non-blank symbols 257 predicted during the previous time steps so far to assist the joint network 252 in predicting the probability of a next output symbol or blank symbol during the current time step. To contribute to techniques for reducing the size of the prediction network 254 without sacrificing accuracy/performance of the decoder 250, the prediction network 254 may receive a limited-history sequence of non-blank symbols 257 $y_{ui-n}, \ldots, y_{ui-1}$ that is limited to the N previous non-blank symbols 257 output by the final Softmax layer 256.

In the example shown, the joint network 252 combines the first higher-order feature representation 245 produced by the audio encoder 240 and/or the second higher-order feature representation 262 produced by the non-causal encoder 260, and the dense representation $p_{u_i}$ 255 produced by the prediction network 254. The joint network 252 predicts a probability distribution $Z_i = P(y_i | x_{t_i}, y_0, \ldots, y_{ui-1})$ 253 over the next output symbol. Stated differently, the joint network 252 generates, at each time step, a probability distribution 253 over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 252 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 252 can include a posterior probability value for each of the different output labels. Thus, if there are 100 different output labels representing different graphemes or other symbols, the output $Z_i$ 253 of the joint network 252 can include 100 different probability values, one for each output label. The probability distribution can then be used to select and assign scores to candidate orthographic elements (e.g., graphemes, wordpieces, and/or words) in a beam search process (e.g., by the Softmax layer 256) for determining the transcription 146.

In the example shown, the final Softmax layer 256 receives the probability distribution $Z_i$ 253 and selects the output label/symbol with the highest probability to produce the transcription 146. The final Softmax layer 256 may employ any technique to select the output label/symbol with the highest probability in the distribution $Z_i$ 253. In this manner, the decoder 250 does not make a conditional independence assumption, rather the prediction of each symbol $y_u$ 257 is conditioned not only on the acoustics but also on the sequence of labels 257 $y_{ui-n}, \ldots, y_{ui-1}$ output so far. The decoder 250 does assume an output symbol 257 is independent of future acoustic frames 144, which allows the speech recognition model 210 to be employed in a streaming fashion.

In some implementations, the prediction network 254 includes a V2 embedding look up table that includes an embedding prediction network. At each time step, the V2 embedding lookup table may receive, as input, the previous two predictions (e.g., 1-hot vectors) output by the joint network 252, compute a respective embedding $d_1, d_2$ for each of the previous two predictions, and provide a concatenated output $[d_1, d_2]$ to the joint network 252. Alternatively, the prediction network 254 may include one or more conformer or transformer layers. Alternatively, the prediction network 254 may be a long short-term memory (LSTM)-based prediction network including one or more LSTM layers, each of which is followed by a projection layer as well as an embedding layer. In some implementations, the joint network 252 includes one or more neural network layers each having a plurality of hidden units, and the Softmax layer 256 is composed of a unified word piece or grapheme set that is generated using all unique word pieces or graphemes in a plurality of training data sets.

Notably, the speech recognition model 210 and the endpointer model 220 may be jointly trained on a set of training speech utterances using multitask learning. Here, each training speech utterance in the set of training speech utterances includes audio data characterizing the training speech utterance paired with a corresponding transcription of the training speech utterance, and a sequence of reference endpointing labels each including one of a reference speech label, a reference initial silence label, a reference intermediate silence label, or a reference final silence label. In some implementations, the speech recognition model 210 is trained on an ASR task using the set of training speech utterances by determining a speech recognition loss $\mathcal{L}_{ASR}$ based on speech recognition results predicted for the audio data by the speech recognition model 210 and the corresponding transcriptions of the training speech utterances, and training the speech recognition model 210 based on the speech recognition loss $\mathcal{L}_{ASR}$. Here, the endpointer model 220 is trained on an endpointing task the set of training speech utterances by determining an endpointing loss $\mathcal{L}_{EP}$ based on the sequence of reference endpointing labels and a corresponding sequence of predicted endpointing labels output by the endpointer model 220, and training the endpointer model 220 based on the endpointer loss $\mathcal{L}_{EP}$. In other implementations, the speech recognition model 210 and the endpointer model 220 are trained based on the same weighted combination loss $\mathcal{L}_{multi}$ determined based on the speech recognition loss $\mathcal{L}_{ASR}$ and the endpointing loss $\mathcal{L}_{EP}$, which may be expressed as $$\mathcal{L}_{multi} = \lambda \mathcal{L}_{ASR} + (1-\lambda)\mathcal{L}_{EP} \qquad \text{EQN (1)}$$

where $\lambda \in [0,1]$ is a hyperparameter defining relative weights given to the speech recognition and endpointing tasks. In some examples, for each training speech utterance, the switch connection 222 randomly chooses the endpointer model 220 to receive, as input, one of the latent representations 243 output from the final layer of the initial stack of multi-head attention layers (i.e., the final layer of the first encoder 242) for the audio data characterizing the training speech utterance, or the audio data characterizing the training speech utterance.

Figure 3:
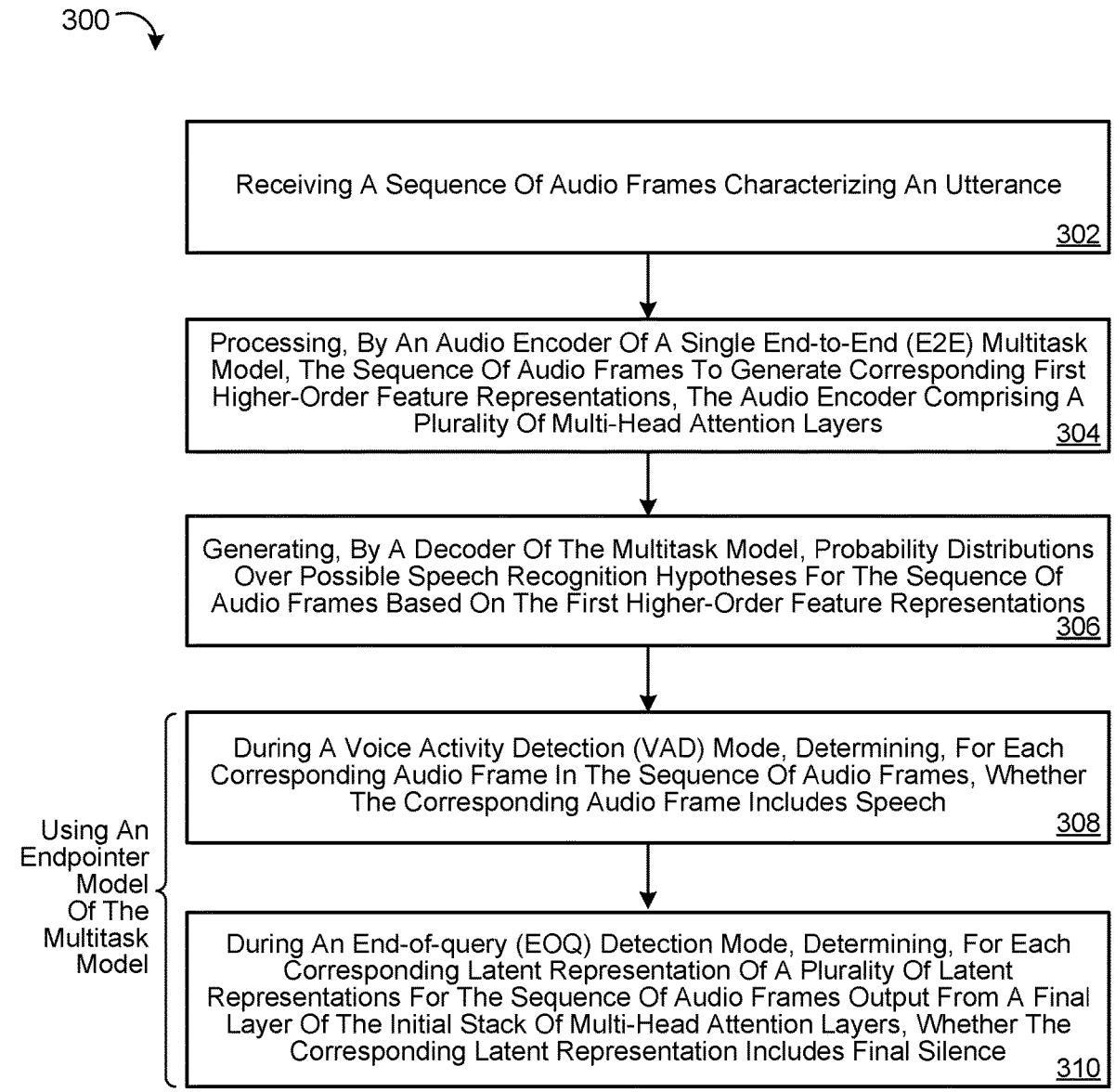
FIG. 3 is a flowchart of an example arrangement of operations for a computer-implemented method of performing unified E2E speech recognition and endpointing using a switch connection.

FIG. 3 is a flowchart of an exemplary arrangement of operations for a computer-implemented method 300 for performing unified E2E speech recognition and endpointing using a switch connection. The operations may execute on data processing hardware 410 (FIG. 4) by executing instructions stored on memory hardware 420 in communication with the data processing hardware 420. The data processing hardware 410 may include the data processing hardware 111 (FIG. 1) of the user device 110 and/or the data processing hardware 121 (FIG. 1) of the remote computing system 120. The memory hardware 420 may include the data memory hardware 112 (FIG. 1) of the user device 110 and/or the memory hardware 122 of the remote computing system 120.

At operation 302, the method 300 includes receiving a sequence of audio frames 144 characterizing an utterance 104. The method 300 includes, at operation 304, processing, by an audio encoder 240 of a single E2E multitask model 200, the sequence of audio frames 144 to generate corresponding first higher-order feature representations 245, the audio encoder 240 including a plurality of multi-head attention layers and, at operation 305, generating, by a decoder 250 of the E2E multitask model 200, probability distributions 253 over possible speech recognition hypotheses for the sequence of audio frames 144 based on the first higher-order feature representations 245; and At operation 308, the method 300 includes using an endpointer model 220 of the E2E multitask model 200 that shares an initial stack 248 of multi-head attention layers 247a—b from a stack 246 of a plurality of multi-head attention layers 247 with the audio encoder 240, during a VAD mode, determining, for each corresponding audio frame 144 in the sequence of audio frames 144, whether the corresponding audio frame 144 includes speech. At operation 310, the method 300 includes using the endpointer model 220, during an EOQ detection mode, determining, for each corresponding latent representation 243 of a plurality of latent representations 243 for the sequence of audio frames 144 output from the final layer 247b of the initial stack 248 of multi-head attention layers 247a—b, whether the corresponding latent representation 243 includes final silence.

Figure 4:
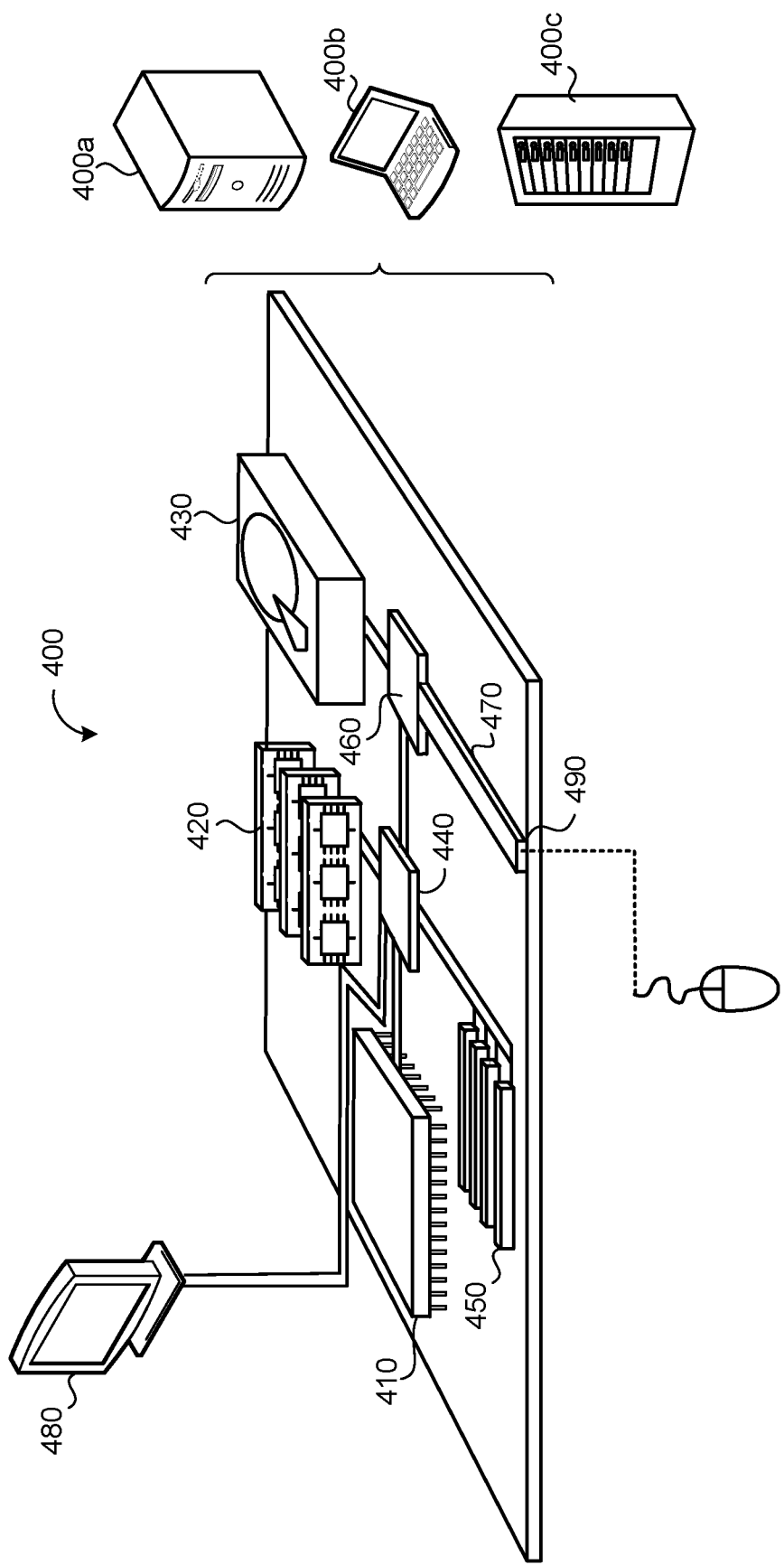
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (i.e., data processing hardware) that can be used to implement the data processing hardware 111 and/or 121, memory 420 (i.e., memory hardware) that can be used to implement the memory hardware 112 and/or 122, a storage device 430 (i.e., memory hardware) that can be used to implement the memory hardware 112 and/or 122, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A single end-to-end multitask model for performing speech recognition and endpointing, the multitask model comprising:
a speech recognition model comprising:
an audio encoder configured to encode a sequence of audio frames into corresponding first higher-order feature representations, the audio encoder comprising a plurality of multi-head attention layers; and
a decoder configured to generate probability distributions over possible speech recognition hypotheses for the sequence of audio frames based on the first higher-order feature representations; and
an endpointer model configured to operate between a voice activity detection (VAD) mode and an end-of-query (EOQ) detection mode, wherein:
during the VAD mode, the endpointer model is configured to receive input audio frames, and determine, for each input audio frame, whether the input audio frame includes speech; and
during the EOQ detection mode, the endpointer model shares an initial stack of multi-head attention layers from the plurality of multi-head attention layers with the audio encoder and is configured to receive latent representations for the sequence of audio frames output from a final layer of the initial stack of multi-head attention layers, and determine, for each of the latent representation, whether the latent representation includes final silence.

2. The multitask model of claim 1, wherein the speech recognition model and the endpointer model are jointly trained on a set of training speech utterances using multitask learning, each training speech utterance in the set of training speech utterances comprising:
audio data characterizing the training speech utterance paired with a corresponding transcription of the training speech utterance; and
a sequence of reference endpointing labels each comprising one of a reference speech label, a reference initial silence label, a reference intermediate silence label, or a reference final silence label.

3. The multitask model of claim 2, wherein the speech recognition model and the endpointer model are jointly trained on the set of training speech utterances by:
determining a speech recognition loss based on speech recognition results predicted for the audio data by the speech recognition model and the corresponding transcriptions of the training speech utterances;
training the speech recognition model based on the speech recognition loss;
determining an endpointer loss based on the sequence of reference endpointing labels and a corresponding sequence of predicted endpointing labels output by the endpointer model; and
training the endpointer model based on the endpointer loss.

4. The multitask model of claim 2, wherein, for each training speech utterance, a switch connection of the multitask model randomly chooses the endpointer model to receive, as input, one of:
latent representations output from the final layer of the initial stack of multi-head attention layers for the audio data characterizing the training speech utterance; or
the audio data characterizing the training speech utterance.

5. The multitask model of claim 1, wherein, when the endpointer model determines the input audio frame includes speech during the VAD mode, the endpointer model switches operation from the VAD mode to the EOQ detection mode.

6. The multitask model of claim 1, wherein, when the endpointer model determines the latent representation includes the final silence during the EOQ detection mode, the endpointer model switches operation from the EOQ detection mode to the VAD mode.

7. The multitask model of claim 1, wherein the decoder comprises:
a prediction network configured to:
receive, as input, a sequence of non-blank symbols output by a final Softmax layer; and
generate, as output, dense representations; and
a joint network configured to:
receive, as input, the dense representations generated by the prediction network at each of a plurality of output steps and the first higher-order feature representation generated by the audio encoder at each of the plurality of output steps; and
generate, at each of the plurality of output steps, the probability distribution over possible speech recognition hypotheses.

8. The multitask model of claim 7, wherein the prediction network comprises:
a long short-term memory (LSTM)-based prediction network; or
a V2 embedding look-up table.

9. The multitask model of claim 1, wherein the plurality of multi-head attention layers comprise conformer layers or transformer layers.

10. The multitask model of claim 1, wherein:
the speech recognition model further comprises a non-causal encoder configured to:
receive, as input, the first higher-order feature representations encoded by the audio encoder; and
generate, as output, corresponding second higher-order feature representations for the first higher-order feature representations; and
the decoder is configured to generate the probability distributions over possible speech recognition hypotheses for the sequence of audio frames based on the second higher-order feature representations.

11. The multitask model of claim 1, wherein the endpointer model comprises a stack of one or more long short-term memory (LSTM) layers followed by a fully-connected layer having a Softmax function configured to predict a probability distribution over possible endpointing labels of speech, initial silence, intermediate silence, and the final silence.

12. A computer-implemented method executed on data processing hardware that causes the data processing hardware to perform operations comprising:
receiving a sequence of audio frames characterizing an utterance;
processing, by an audio encoder of a single end-to-end multitask model, the sequence of audio frames to generate corresponding first higher-order feature representations, the audio encoder comprising a plurality of multi-head attention layers;
generating, by a decoder of the multitask model, probability distributions over possible speech recognition hypotheses for the sequence of audio frames based on the first higher-order feature representations; and using an endpointer model of the multitask model that shares an initial stack of multi-head attention layers from the plurality of multi-head attention layers with the audio encoder:

during a voice activity detection (VAD) mode, determining, for each corresponding audio frame in the sequence of audio frames, whether the corresponding audio frame includes speech; and during an end-of-query (EOQ) detection mode, determining, for each corresponding latent representation of a plurality of latent representations for the sequence of audio frames output from a final layer of the initial stack of multi-head attention layers, whether the corresponding latent representation includes final silence.

13. The computer-implemented method of claim 12, wherein the audio encoder, the decoder, and the endpointer model are trained jointly on a set of training speech utterances using multitask learning, each training speech utterance in the set of training speech utterances comprising:

audio data characterizing the training speech utterance paired with a corresponding transcription of the training speech utterance; and a sequence of reference endpointing labels each comprising one of a reference speech label, a reference initial silence label, a reference intermediate silence label, or a reference final silence label.

14. The computer-implemented method of claim 13, wherein the audio encoder, the decoder, and the endpointer model are trained jointly on the set of training speech utterances by:

determining a speech recognition loss based on the transcriptions of the training speech utterances and corresponding speech recognition results predicted for the audio data by the audio encoder and the decoder;

training at least one of the audio encoder or the decoder based on the speech recognition loss;

determining an endpointer loss based on the sequence of reference endpointing labels and a corresponding sequence of predicted endpointing labels output by the endpointer model; and training the endpointer model based on the endpointer loss.

15. The computer-implemented method of claim 13, wherein, for each training speech utterance, a switch connection of the multitask model randomly chooses the endpointer model to receive, as input, one of:

latent representations output from the final layer of the initial stack of multi-head attention layers for the audio data characterizing the training speech utterance; or the audio data characterizing the speech utterance.

16. The computer-implemented method of claim 12, wherein the operations further comprise, based on determining the corresponding audio frame includes speech during the VAD mode, switching operation of the endpointer model from the VAD mode to the EOQ detection mode.

17. The computer-implemented method of claim 12, wherein the operations further comprise, based on determining the corresponding latent representation includes the final silence during the EOQ detection mode, switching operation of the endpointer model from the EOQ detection mode to the VAD mode.

18. The computer-implemented method of claim 12, wherein:

the decoder comprises a prediction network and a joint network; and the operations further comprise, at each of a plurality of output steps:

generating, by the prediction network, based on a sequence of non-blank symbols output by a final Softmax layer, corresponding dense representations; and generating, by the joint network, a corresponding probability distribution over possible speech recognition hypotheses based on the corresponding dense representation generated by the prediction network at the corresponding output step.

19. The computer-implemented method of claim 18, wherein the prediction network comprises:

a long short-term memory (LSTM)-based prediction network; or a V2 embedding look-up table.

20. The computer-implemented method of claim 12, wherein the plurality of multi-head attention layers comprise conformer layers or transformer layers.

21. The computer-implemented method of claim 12, wherein the operations further comprise:

generating, using a non-causal encoder of the multitask model, a corresponding second higher-order feature representation for each first higher feature representation generated by the audio encoder; and generating the probability distributions over possible speech recognition hypotheses for the sequence of audio frames based on the second higher-order feature representations.

22. The computer-implemented method of claim 12, wherein the endpointer model comprises a stack of long short-term memory (LSTM) layers followed by a fully-connected layer having a Softmax function configured to predict a probability distribution over possible endpointing labels of speech, initial silence, intermediate silence, and the final silence.

* * * * *